May 19, 1936.  E. C. BALLMAN  2,041,104
SHAFT COUPLING
Filed May 5, 1934
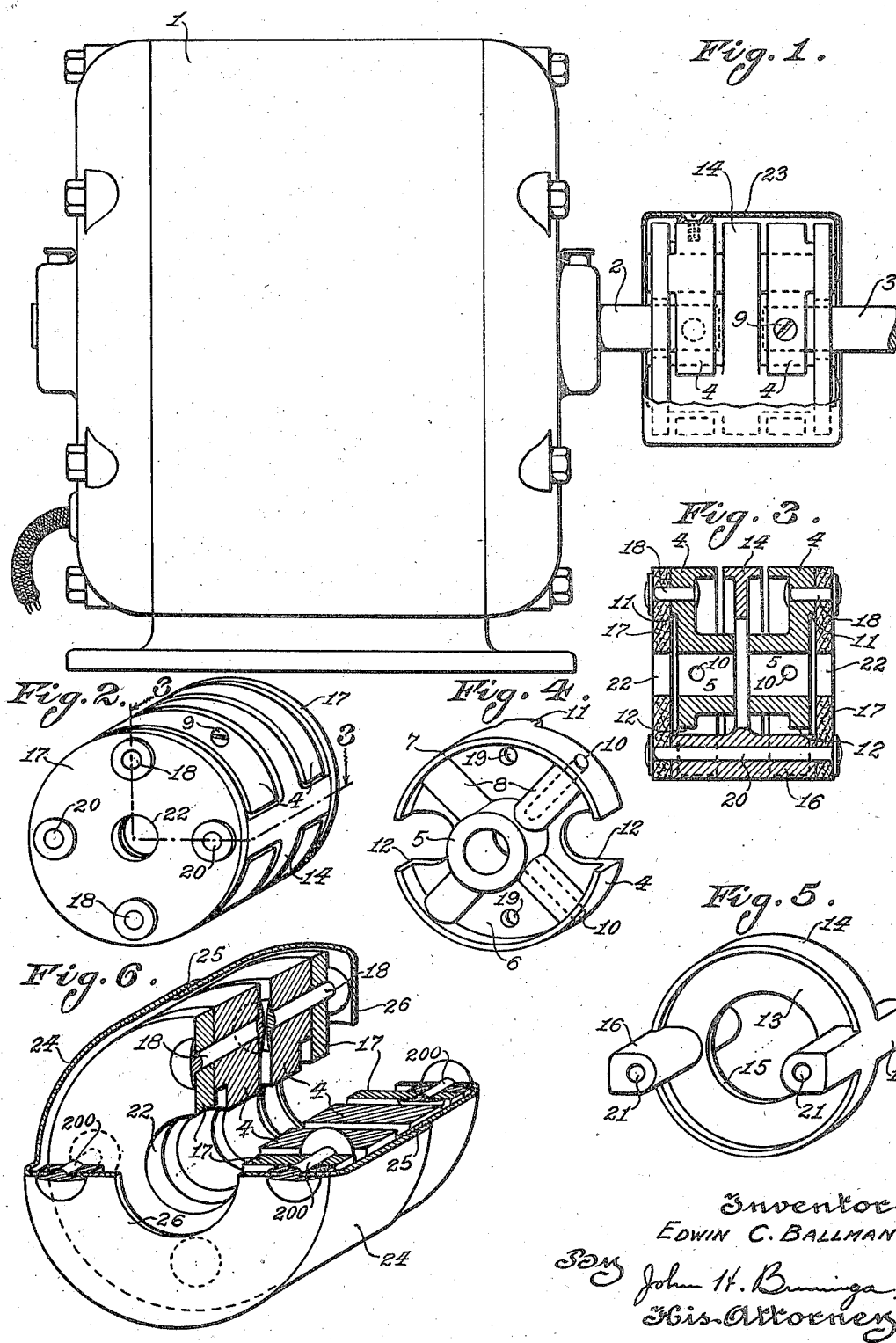
Inventor:
EDWIN C. BALLMAN,
John H. Buninga
His Attorney.

Patented May 19, 1936

2,041,104

UNITED STATES PATENT OFFICE 2,041,104

SHAFT COUPLING

Edwin C. Ballman, St. Louis, Mo.

Application May 5, 1934, Serial No. 724,069

4 Claims. (Cl. 64—13)

This invention pertains to flexible shaft couplings, such as may be used to connect driving and driven shafts so as to permit a certain amount of misalinement.

One of the objects of this invention is to provide such a coupling which will permit the shafts to be axially misalined, both as to lateral displacement and as to parallelism of axes.

Another object is to provide such a coupling which will run silently or nearly so.

Another object is to provide such a coupling requiring a minimum of space lengthwise of the shafts.

Another object is to provide such a coupling which will be simple in construction, rugged in service and present a neat appearance.

Further objects will appear from the following description taken in connection with the accompanying drawing, in which:

Figure 1 is a front view of a driving motor showing a coupling embodying this invention partly in section and connecting the motor shaft to its load;

Figure 2 is a perspective view of a coupling embodying this invention;

Figure 3 is a longitudinal section of the same taken on line 3—3 of Figure 2;

Figure 4 is a perspective detail of one of the shaft flanges;

Figure 5 is a perspective detail of the intermediate element; and

Figure 6 is a perspective view partly in section illustrating another embodiment of this invention.

Referring to the drawing, 1 indicates a motor, or any other suitable source of power having a driving shaft 2 which is to be coupled to a driven shaft 3 connected to the load to be driven. Mounted on the ends of the shafts 2 and 3 are coupling flanges 4.

One of these flanges is shown in perspective in Figure 4. It comprises a hub 5 mountable on one of the shafts in the usual manner, a web 6 and an annular rim 7. There may be provided between the hub and the rim stiffening spokes 8, although these are not essential. The hub 5 may be secured to its shaft in any suitable manner as by a key or a set screw 9 engaging a tapped hole 10 in one of the spokes 8. Each flange 4 may be provided on its outer face with a pair of projecting lugs or bosses 11 positioned at diametrically opposite points near the rim. The flanges 4 are placed on the shafts in the relative positions shown in Figure 3 with the bosses 11 faced outwardly from each other. The flanges are further provided with a pair of recesses 12 at diametrically opposite points on a diameter transverse to that on which the lugs 11 are positioned.

The intermediate member shown in Figure 5 is generally annular in shape having a web 13 and a rim 14, the web 13 being provided with a central opening 15 through which the shafts may pass. This opening may in fact be made large enough to receive the ends of the hubs 5. At diametrically opposite points on the intermediate member there are provided axially extending lugs 16. These lugs extend in both directions from the web 13 and are long enough to extend beyond the flanges 4 to the outer faces thereof, as may be seen from Figure 3. In the assembled coupling these lugs pass through the recesses 12 in the flanges, which recesses are large enough to allow a proper amount of play between these members.

On the outside faces of the flanges 4 means are provided for flexibly connecting said flanges to the intermediate member. In the embodiment illustrated these take the form of discs 17 of leather, rubber, or other suitable flexible material. These discs are secured by fasteners 18, such as rivets, to the flanges 4 at the bosses 11, said fasteners passing through perforations 19 in the flanges. It will be noted that each disc 17 is connected to the flange 14 at diametrically opposite points. These discs are also connected to the intermediate member at the lugs 16 by fasteners 20, such as bolts, rivets or the like, passing through perforations 21 extending lengthwise through said lugs. These connections are also made at diametrically opposite points on the discs 17, this diameter, however, being transverse to that on which the connections 18 are positioned. The discs 17 have perforations 22 through which the shafts 2 and 3 may pass.

In the operation of this coupling, supposing that the flanges 4 are carried by shafts which are slightly out of alinement, each disc 17 being flexible permits the intermediate member to assume a position angular with respect to the flange 4. When such angularity is in one direction with respect to the shaft the flexure takes place at the diametrically opposite fastenings 18, while when the angularity is in a transverse direction the flexure takes place at the fastenings 20 between the disc and the intermediate member. Accordingly, the intermediate member is free to assume any angular position with respect to each of the flanges 4 within the limits imposed by the clearances provided. Accordingly, both shafts may rotate smoothly, while the intermediate member assumes a continually changing angular relation with respect to both shafts. The torque is transmitted from one flange to its disc 17, thence to the intermediate member and by it to the other disc 17, then from the latter disc to the other flange 4 and thus to the driven shaft.

In order to provide a finished appearance and to avoid danger of foreign objects getting into the coupling, a cover 23 may be provided as shown in Figure 1. This may take the form of a simple cylinder of suitable material extending over the entire coupling and secured to the intermediate member, or to one of the flanges 4.

In the embodiment of Figure 6, the flanges 4 are constructed similarly to those of Figure 4, except that the recesses 12 will be unnecessary. The discs 17 are similarly positioned and constructed. The intermediate member, however, takes the form of an outer enclosing member 24. This may be constructed in two half portions, cup shaped, and arranged to be connected as by threads 25, or other suitable means, after being assembled around the other parts. The ends of the member 24 are provided with inturned flanges 26. These flanges provide means whereby the discs 17 may be attached to the intermediate member. This is done by means of fasteners 200 corresponding to the fasteners 20 of Figure 3. Again these connections are made on a diameter transverse with that of the connections 18 between the discs and the flanges. The operation of this embodiment is similar to that described for the first embodiment, the member 24 performing the functions both of the intermediate member and of the cover. As this member transmits the torque the fastening 25 may be locked in any suitable manner. This may be done by soldering the two half portions together after assembly, or by inserting suitable fasteners to lock the two portions securely together.

It will be seen that this invention provides a shaft coupling of simple construction and such that a completely flexible connection may be established between driving and driven shafts even when slightly out of alinement. The discs 17 being of flexible material, the changes in angularity are taken up by flexure of these discs. Accordingly there are no loose joints and the coupling runs practically without making any noise. While the discs 17 provide the preferable manner of making the flexible connections, particularly in small couplings, it will be understood that rigid members may be used in their stead by providing swivel joints at the connections 18 and 20.

The embodiment of Figure 6 provides a coupling which, not only permits bringing the two shafts practically end to end on account of the close spacing of the flanges 4, but as the cover also provides the intermediate torque transmitting member, a completely enclosed coupling is provided. In this case also rigid members with swivel joints may be provided in place of the discs 17 as, for instance, in large couplings. While this invention has been described as embodied in a unitary device, it will be understood that certain individual features or sub-combinations, may be useful by themselves without reference to other features or the complete combination. It is understood that the employment of such individual features or sub-combinations, is contemplated by this invention and is within the scope of the appended claims.

It is further obvious that various changes may be made, within the scope of the appended claims, in the details of construction without departing from the spirit of this invention; it is to be understood, therefore, that this invention is not limited to the specific details shown and/or described.

Having thus described the invention, what is claimed is:

1. A flexible shaft coupling, comprising, a pair of flange members attachable each to one of the shafts to be coupled, annular end members through which the shafts extend positioned outside of said flange members and flexibly connected thereto, and a cover member providing a torque-transmitting member extending past said flange members and flexibly connected to said end members on axes displaced from the connections to said flange members.

2. A flexible shaft coupling, comprising, a pair of flange members attachable each to one of the shafts to be coupled, annular end members through which the shafts extend positioned outside of said flange members and flexibly connected thereto, a cover member providing a torque-transmitting member constructed in separable parts, said cover member extending past said flange members and being flexibly connected to said end members on axes displaced from the connection to said flange members, and means for locking the separate parts of said cover member together.

3. A flexible shaft coupling, comprising, a pair of flange members having hubs attachable to the shaft to be coupled spaced closely adjacent to each other at their inner ends and provided with radially extending portions at their outer ends, an intermediate member having a portion extending around said hubs and a portion extending axially thereof, driving members positioned outside of said radially extending portions, means connecting each of said driving members to said intermediate member for flexure at two points only in diametrically opposite relation with respect to the shafts, all said points being substantially in one plane, and means connecting each of said driving members to one of said flange members at the radially extending portion thereof for flexure at two points only in diametrically opposite relation with respect to said shafts, the points of connection of each of said driving members to said intermediate member and said flange member respectively being on substantially perpendicular lines.

4. A flexible shaft coupling, comprising, a pair of flange members having hubs attachable to the shaft to be coupled spaced closely adjacent to each other at their inner ends and provided with radially extending portions at their outer ends, an intermediate member having a portion extending around said flange members and a portion extending axially thereof, driving members positioned outside of said radially extending portions, means connecting each of said driving members to said intermediate member for flexure at two points only in diametrically opposite relation with respect to the shafts, all said points being substantially in one plane, and means connecting each of said driving members to one of said flange members at the radially extending portion thereof for flexure at two points only in diametrically opposite relation with respect to said shafts, the points of connection of each of said driving members to said intermediate member and said flange member respectively being on substantially perpendicular lines.

EDWIN C. BALLMAN.